Feb. 11, 1969     D. W. COLE ET AL     3,427,077

DYNAMIC WHEEL BALANCER

Filed June 28, 1967

INVENTORS
DONALD W. COLE
ARLAN E. MITCHELL
BEAUFORD I. WHITLOCK

ATTORNEY

United States Patent Office 3,427,077
Patented Feb. 11, 1969

3,427,077
DYNAMIC WHEEL BALANCER
Donald W. Cole, Fort Worth, Tex., and Arlan E. Mitchell and Beauford I. Whitlock, Stafford, Kans., assignors to AWB Manufacturing Co., Inc., Stafford, Kans., a corporation of Kansas
Filed June 28, 1967, Ser. No. 649,625
U.S. Cl. 301—5    4 Claims
Int. Cl. B60b 13/00; G01m 1/32

ABSTRACT OF THE DISCLOSURE

A dynamic wheel balancer which includes a balancer ring having a relatively flat side portion which is provided with a lip that defines the outer diameter of the ring. The ring is fixedly accommodated within an annular plate having an upstanding rim at its outer periphery which is clamped over the balancer ring lip for concentrically mounting the balancer ring to the plate. The plate proximate its inner diameter is provided with a plurality of apertures through which lug bolts may be passed for fixing the wheel balancer to a motor vehicle wheel between the brake drum and the disk of the wheel.

FIELD OF THE INVENTION

This invention relates to wheels, and more particularly, to weights for land wheels.

THE PRIOR ART

Dynamic wheel balancers utilized within the past several years typically have taken the form of an annular casing enclosing a plurality of balls or other balancing elements, together with a quantity of oil or other hydraulic fluid. With the balancer concentrically mounted on a wheel, the balls position themselves on rotations substantially diametrically opposed to the mass tending to cause imbalance of the wheel. The effect of the positioning of the balls is thus to move the center of mass of the wheel into coincidence with the center of rotation and thus eliminate vibration and uneven operation of the wheel.

Typical dynamic wheel balancers are illustrated by the following United States Letters Patent: 2,687,918; 2,737,420; 2,801,883; 2,853,344; 2,909,389; 3,006,690; 3,063,854; 3,166,356; and 3,202,459. U..S patent application Ser. No. 573,728, filed Aug. 19, 1966, now Patent No. 3,376,075, for a "Dynamic Wheel Balancer" and assigned to the assignee hereof also discloses a dynamic wheel balancer.

SUMMARY

A dynamic wheel balancer for concentric mounting on a motor vehicle wheel between the brake drum and the disk of the wheel which includes a balancer ring having a relatively flat cap portion which is provided with a radially extending lip. An annular plate having an inturned crimpable rim on its outer periphery and a plurality of apertures spaced about the plate for receiving lug bolts therethrough is attached to the balancer ring by crimping the rim of the plate over the radially extending lip of the balancer ring.

DRAWINGS

PREFERRED EMBODIMENTS

Figure 1:
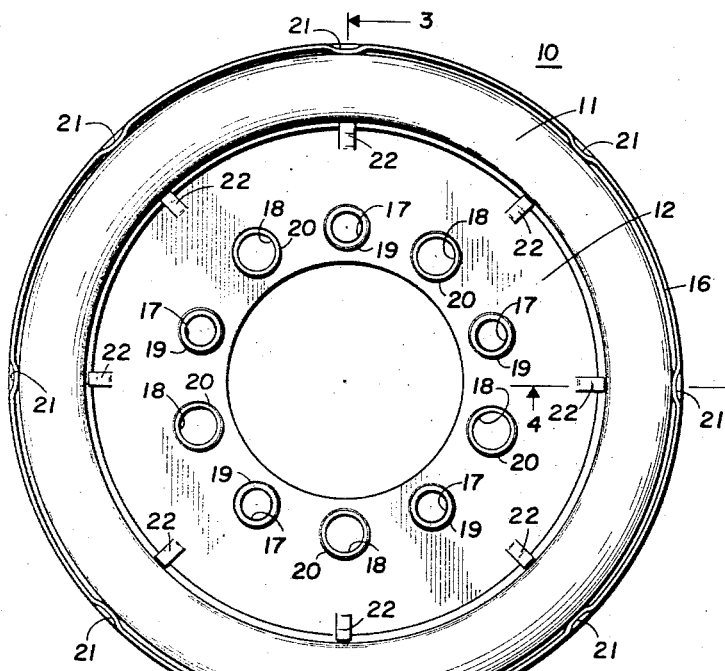
FIGURE 1 is a front elevational view of one embodiment of the present invention.

In FIGURE 1, the dynamic wheel balancer 10 includes a balancer ring 11 and an annular mounting plate 12 which is secured to ring 11. As particularly illustrated by FIGURE 3, the balancer ring 11 includes an annular shell 13, having legs 13a and 13b. Shell 13 is enclosed to form a chamber 14 by an annular cap 15 having lips 15a and 15b which accommodate there between legs 13a and 13b of shell 13, respectively, and are affixed thereto by any suitable means, such as a plastic cement.

Mounting plate 12, to which balancer ring 11 is attached, is provided at its outer diameter with a circular rim 16 and proximate its inner diameter with a plurality of apertures 17 and 18.

Figure 4:
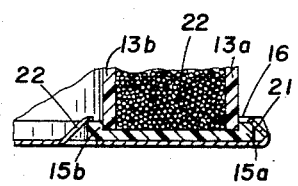
FIGURE 4 is a cross-sectional view taken along line 4—4 of FIGURE 1 and partially cutaway.
Figure 3:
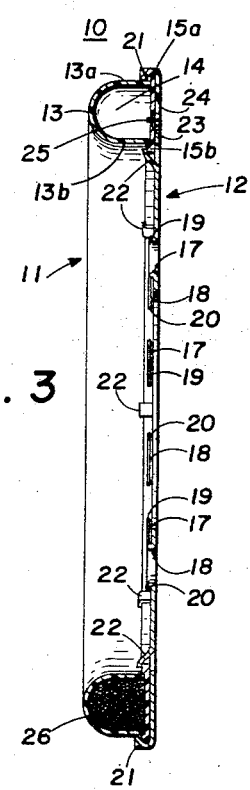
FIGURE 3 is a cross-sectional view taken along line 3—3 of FIGURE 1.
Figure 2:
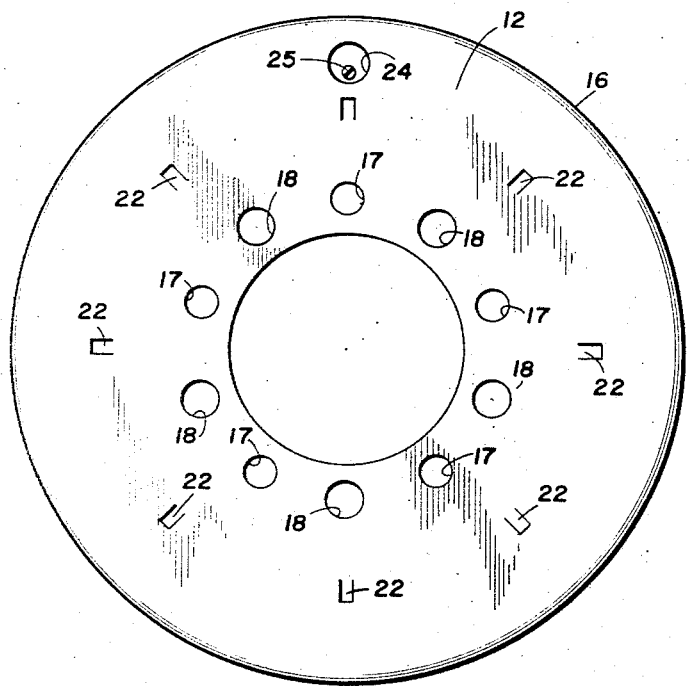
FIGURE 2 is a rear elevational view of the embodiment illustrated in FIGURE 1.

Each of the apertures 17 and 18 are defined by embossed peripheries 19 and 20, respectively, the front to back depth of which, as viewed in FIGURE 3, is greater than the distance between the apexes of adjacent threads on a conventional lug bolt to prevent the plate 12 during use from dropping between threads on a lug bolt and effecting misalignment of the balancer assembly 10. Balancer ring 11 is affixed to mounting plate 12 by forming crimped portions 21 in rim 16. Crimp portions 21, as illustrated in FIGURE 3, overlie the radically extending lip 15a of balancer ring 11 to retain balancer ring 11 affixed to support plate 12. To assure that balancer ring 11 is affixed to plate 12, there are also provided a plurality of fingers 22, formed by stamped out portions of plate 12. Fingers 22 are bent over the inner lip 15b of balancer ring 11, as illustrated in FIGURES 1, 3 and 4.

Balancer ring 11 carries conventional weight means, such as fine shot or a plurality of steel balls 26 which are free to move throughout chamber 14. Chamber 14 is also partially filled with a conventional damping fluid, such as glycerin, ethylene glycol, transmission or brake fluid. The steel balls 26 may be installed in chamber 14 before cap 15 is affixed thereto, or alternatively, the steel balls 26 and hydraulic or damping fluid may be introduced into chamber 14 through apertures 23 and 24 in balancer ring 11 and mounting plate 12, respectively. After chamber 14 has been filled with steel balls 26 and the damping fluid, a screw 25 may be passed through aperture 24 into apertures 23 for sealing the chamber 14 to prevent loss of the fluid and/or steel balls 26.

In operation, cap 15 is secured to shell 13 by conventional means and the assembly positioned concentrically on support plate 12 between fingers 22 and rim 16. Inner diameter of rim 21 is slightly larger than the outer diameter of lip 15a to permit accommodation of the balancer ring 11 therein, but preferably it is not so much larger than balancer ring 11 could become eccentrically mounted relative to plate 12. After positioning shell 13 and cap 15 against support plate 12, as illustrated in FIGURE 3, rim 16 is crimped at a plurality of positions about the periphery of lip 15a to form crimps 21 and fingers 22 are bent over the inner lip 15b to concentrically mount balancer ring 11 to plate 12. Screw 25 may be removed, and if steel balls 26 have not been placed in chamber 14 before application of cap 15 to shell 13, balls 26 may be fed through apertures 24 and 23 after which the chamber 14 may be filled with a suitable damping fluid. Screw 25 is then replaced and balancer assembly 10 is positioned in abutment with a brake drum so that either apertures 17 or 18, depending upon the wheel size, pass over lug bolts used to secure the motor vehicle wheel to the brake drum. For example, apertures 17 may be disposed to accept bolts lying on a circle having a radius of 4½ inches. The disk portion of the wheel is then passed over the lug bolts. The wheel balancer 10 is thus concentrically secured between the disk of the wheel and the brake drum.

The embodiment of the invention illustrated in FIGURES 1-4 preferably includes a balancer ring 11 constructed of plastic or the like and a support plate 12 constructed of a suitable metal such as steel or aluminum. Support plate 12 is preferably formed of a metal to minimize expansion and contraction of the balancer assembly 10 under the influence of temperatures encountered during operation of the vehicle, and to provide a plate which will not fail due to fatigue. The embodiment illustrated in FIGURES 1-4 is easily manufactured, and the provision of a mounting plate 12 having a cylindrical rim 16 which receives therewithin a balancer ring assures concentric mounting of the balancer ring and the plate 12. In order to further insure concentric mounting, the crimps 21 are preferably made simultaneously to prevent movement of balancer ring 11 relative to plate 12 when the crimps are made.

We claim:
1. A dynamic wheel balancer for concentric mounting on a motor vehicle wheel between a brake drum and the disk of the wheel, comprising:
   a balancer tube containing freely movable weight means and a damping fluid, said tube having an annular semicircular axially opening channel portion and being closed at the open side by a relatively flat cap portion provided with a radially outwardly extending lip;
   an annular metallic mounting plate having an axially extending crimpable rim flange formed at its outer periphery and a plurality of apertures regularly spaced about the plate proximate the inner diameter thereof for receiving a plurality of lug bolts therethrough, the inner diameter of said rim being slightly larger than the outer diameter of said lip on said balancer ring, said cap portion of said tube being positioned within said rim and said rim crimped over said lip on said plate.

2. The apparatus of claim 1, wherein said cap portion and said plate are provided with apertures adapted to register upon assembly of said ring and said plate through which damping fluid may be added to said ring; and
   removable means for closing the aperture in said ring to prevent loss of fluid during use of said balancer.

3. The apparatus of claim 1, wherein
   said channel forming member has opposed legs which define inner and outer diameters of the channel member; and
   said annular cap having lips adapted to receive the legs of said channel member therebetween; and
   means securing the legs of said channel member to the legs of said plate thereby forming said tube.

4. The apparatus of claim 1, where:
   said balancer ring cap portion also has a radially inwardly extending lip; and
   said mounting plate is provided with a plurality of fingers adapted to be bent over the inwardly extending lip.

References Cited

UNITED STATES PATENTS

| | | | |
|---|---|---|---|
| 3,346,303 | 10/1967 | Wesley | 301—5 |
| 3,376,075 | 4/1968 | Mitchell | 301—5 |

RICHARD J. JOHNSON, *Primary Examiner.*